(12) United States Patent
Spezie et al.

(10) Patent No.: US 12,500,360 B2
(45) Date of Patent: Dec. 16, 2025

(54) GROUNDING SYSTEM FOR TOWERS OF OVERHEAD POWER LINES

(71) Applicant: Terna S.P.A., Rome (IT)

(72) Inventors: Roberto Spezie, Rome (IT); Francesco Palone, Rome (IT); Luca Buono, Rome (IT); Maurizio Carbone, Rome (IT); Piero Matli, Rome (IT)

(73) Assignee: Terna S.P.A., Rome (IT)

( * ) Notice: Subject to any disclaimer, the term of this patent is extended or adjusted under 35 U.S.C. 154(b) by 197 days.

(21) Appl. No.: 18/285,267

(22) PCT Filed: Mar. 31, 2022

(86) PCT No.: PCT/IB2022/052999
§ 371 (c)(1),
(2) Date: Oct. 2, 2023

(87) PCT Pub. No.: WO2022/208422
PCT Pub. Date: Oct. 6, 2022

(65) Prior Publication Data
US 2024/0195088 A1  Jun. 13, 2024

(30) Foreign Application Priority Data
Mar. 31, 2021  (IT) .......................... 102021000008051

(51) Int. Cl.
*H01R 4/00* (2006.01)
*H01R 4/66* (2006.01)

(52) U.S. Cl.
CPC ..................................... *H01R 4/66* (2013.01)

(58) Field of Classification Search
CPC ...................................................... H01R 4/66
See application file for complete search history.

(56) References Cited

FOREIGN PATENT DOCUMENTS

| CN | 203707350 | 7/2014 |
| CN | 103457044 | 8/2015 |

(Continued)

OTHER PUBLICATIONS

Zhang (CN 111864420 A; published in Oct. 30, 2020) (Year: 2020).*

(Continued)

*Primary Examiner* — Pete T Lee

(57) ABSTRACT

The invention relates to a grounding system for a tower of an overhead power line, wherein said tower is anchored to the ground by means of one or more anchorage structures (1) at least partially buried. The grounding system is buried and comprises: a first electrically conductive ring-type grounding element (21) which is buried at a first predefined depth, extends horizontally around the anchorage structure (s) (1) of the tower and is electrically connected to the tower; a second electrically conductive ring-type grounding element (22) which is buried at a second predefined depth greater than the first predefined depth, extends horizontally around the anchorage structure (s) (1) of the tower, is larger than the first ring-type grounding element (21) and is electrically connected to the first ring-type grounding element (21) by one or more grounding conductors (24, 26, 28); and one or more micropiles (23, 25, 27, 54) which are electrically connected to the second ring-type grounding element (22), extend vertically or obliquely downwards from said second ring-type grounding element (22) and are configured to act as deep earthing elements.

12 Claims, 11 Drawing Sheets

(56) References Cited

FOREIGN PATENT DOCUMENTS

| | | |
|---|---|---|
| CN | 211182560 | 8/2020 |
| CN | 111864420 | 10/2020 |
| KR | 10-2009-0102151 | 9/2009 |
| WO | WO 2022/208422 | 10/2022 |

OTHER PUBLICATIONS

International Search Report and the Written Opinion Dated Jul. 5, 2022 From the International Searching Authority Re. Application No. PCT/IB2022/052999. (10 Pages).

Rapporto di Ricerca e l'Opinione Scritta [Search Report and the Written Opinion] Dated Oct. 11, 2021 From the Ministero Dello Sviluppo Economico, Direzione Generale Sviluppo Produttivo e Competitivita, Ufficio Italiano Brevetti e Marchi Re. Application No. IT202100008051. (10 Pages).

\* cited by examiner

GROUNDING SYSTEM FOR TOWERS OF OVERHEAD POWER LINES

RELATED APPLICATIONS

This application is a National Phase of PCT Patent Application No. PCT/IB2022/052999 having International filing date of Mar. 31, 2022, which claims the benefit of priority of Italy Patent Application No. 102021000008051 filed on Mar. 31, 2021. The contents of the above applications are all incorporated by reference as if fully set forth herein in their entirety.

FIELD AND BACKGROUND OF THE INVENTION

The present invention relates, in general, to the field of overhead power lines and, in particular, to an innovative system for the grounding of overhead power line towers based on the combined use of an underground structure with a double perimeter ring and one or more electrical deep earthing elements made by means of micropiles.

As is well known, the coordination of the insulation of overhead power lines determines, together with the environmental characteristics of the installation site (i.e., keraunic level, ground resistivity, soil conformation, etc.) and the geometrical characteristics of the overhead power line (i.e., heights, number of shield wires, etc.), the expected failure rates of the overhead power lines.

The phenomenon of reverse discharge occurs when, following a lightning strike incident on the power lines (directed on the tower or directed on the shield wires), the voltage generated by the dispersion of the lightning current (dispersed by the tower earthing systems) is greater than the withstand voltage of the insulators, thus a discharge occurs between the metal structure of the tower and the conductor (i.e. a reverse discharge). As a result of this phenomenon, a single-phase (phase-to-ground) failure condition occurs with a significant drop in voltage on the grid (voltage dip).

The voltage which stresses the insulators is, therefore, a function proportional not only to the value of the lightning current drained to earth by the tower grounding system, but also to the value of the impulse resistance (or rather the high-frequency impedance) of the grounding system itself. Lower impulse resistance (or high-frequency impedance) values contribute to a reduction in the risk of reverse discharge.

The large number of these events and, therefore, of voltage dips generated by the reverse discharge phenomenon may cause considerable economic damage to electricity system industrial users; sector studies and scientific publications have shown damage ranging from 1 €/KW to 3.5 €/kW of load affected by the voltage dip, in relation to the manufacturing sector.

Very effective tower grounding systems represent the best way to improve failure rates of power lines caused by lightning strikes. In general, the main aim of the tower grounding systems is to mitigate the reverse discharge phenomena due to high current atmospheric lightning strikes (i.e. hundreds of kA).

A well-established practice in the design of grounding systems is the use of four long counterweights consisting of steel or copper strips/ropes with significant lengths (up to 120 m), connected to the posts of the towers. These solutions involve, though indirectly, a certain surface occupation of the land and, consequently, a possible removal of vegetation and limitation in land use, as well as a greater exposure to mechanical stresses due to a burial depth of no more than 1 m and an extension of up to 120 m from the base of the tower.

The evolution of the electricity system in the last decades has substantially changed the impact of single-phase failures on the electricity system and its users. The increased penetration of renewable sources and the consequent reduction of traditional generation have increased the area of influence of voltage dips caused by single-phase failures, determining an increase in the economic damage for users connected to the Transmission Grid, resulting from a single failure event. At the same time, the so-called global warming phenomenon is expected to increase the number of lightning strikes per $km^2$ on the one hand, and of dry periods on the other: ultimately, therefore, the increase in the annual average value of ground resistivity.

It is therefore reasonable to expect a trend worsening the failure rate of overhead power lines as a result of climate change.

As described above, a well-established practice in the design of grounding systems is to use four long counterweights made of steel or copper strips/ropes up to 120 m long, buried horizontally and connected to the posts of the towers. However, such a solution has several critical issues:

- the high-frequency impedance (or impulse resistance) of a buried counterweight decreases as its length increases; however, the reduction effect is subject to a saturation phenomenon; therefore, beyond a certain length value of the conductor (approx. 40 m), further increases in length do not correspond to significant reductions in high-frequency impedance (or impulse resistance);
- the findings during the construction step of the aforementioned plants highlight a number of difficulties in the operative execution steps; in fact, the presence of obstacles (such as, for example, fences, changes in the slope of the land, presence of rocks, etc.) do not always allow for the construction of such large plants;
- due to a burial depth of no more than 1.0 m and a horizontal extension (i.e. parallel to the ground plane) of up to 120 m from the tower base, the grounding systems with counterweights are more sensitive to climatic changes; in fact, the resistivity value of the ground is a function of the concentration of moisture present therein and, therefore, the electrical performance of grounding systems with counterweights is strongly affected by climatic conditions;
- in addition, overhead power lines mainly concern agricultural areas or, in any case, non-urbanized areas; the depth at which the conductors are laid does not, therefore, guarantee protection against mechanical stresses resulting from agricultural activities (e.g. ploughing the land);
- grounding systems with counterweights are not optimised to mitigate contact and step voltages near the tower.

For the above-reported reasons, grounding systems with counterweights are often reinforced by the installation of a perimeter ring (to contain contact voltages near the tower) and one or more vertical/tilted stakes of limited length.

For example, a known solution for grounding overhead power line towers at a nominal voltage of 10 kV, based on the use of a perimeter ring and vertical stakes, is disclosed in CN103457044B.

In particular, CN103457044B discloses a grounding device comprising:
- a buried perimeter ring made of iron or steel, arranged horizontally around a tower of an overhead power line with a nominal voltage of 10 kV;
- a ground conductor connected at a first end, to the tower and, at a second end, to the buried perimeter ring; and
- five rod grounding electrodes (i.e. essentially five stakes) buried 2 m each, which are connected to the buried perimeter ring and extend vertically downwards from the buried perimeter ring.

In addition, a further example of a grounding device for overhead power line towers based on the use of a perimeter ring and stakes (in this case both vertical and tilted) is disclosed in CN203707350U.

In particular, the grounding device according to CN203707350U includes:
- a buried perimeter ring arranged at a depth comprised between 0.6 m and 1.0 m;
- at least four buried vertical grounding electrodes (i.e., substantially, at least four stakes), which are distributed around the buried perimeter ring, are connected to the latter and extend vertically downwards from said buried perimeter ring;
- at least four buried oblique grounding electrodes (i.e., substantially, at least four stakes), which are connected to the buried perimeter ring at the same points where the vertical stakes are also connected, where said oblique stakes are tilted at an angle of 45° with respect to, and are at least one and a half times as long as, said vertical stakes; and
- a rectangular buried grid structure that is connected to the bottom of the vertical stakes.

It should be noted, however, that the use of vertical/tilted stakes implies several critical issues:
- the stakes have a small diameter (typically a few tens of mm);
- very long stakes can only be inserted vertically in order to ensure axial forces generated by a pneumatic hammer or sledgehammer, while an off-axis insertion could damage or irreparably bend the stake;
- stakes of a limited length may be tilted; however, compliance with the inclination angle during installation is not ensured;
- the installation of vertical or tilted stakes is difficult to achieve in very cohesive grounds or with rocks, regardless of their length.

The vertical or tilted stakes of known grounding systems are therefore of limited length, according to the typical foundation dimensions of overhead power line towers.

However, referring to the grounding device according to CN203707350U, it is important to note that the presence at the bottom of the rectangular grid structure could make it rather difficult, if not impossible, to install this grounding device at existing towers. In fact, the installation, at a later moment, of such a rectangular grid structure could cause damage to the foundations of pre-existing towers, in addition to certainly require the removal of the ground and thus of its stabilising effect on the proper statics of the tower and of the line against the risk of overturning due to the effect of the existing mechanical pulls or of the actions by external agents (such as wind).

SUMMARY OF THE INVENTION

In the light of the foregoing, the Applicant felt the need to carry out a very thorough research in order to develop an innovative solution for grounding overhead power line towers capable of overcoming the above-mentioned technical problems of known solutions, thus leading to conceive the present invention.

Therefore, an aim of the present invention is to provide an innovative solution for grounding overhead power line towers that is capable of overcoming the technical problems of the currently known solutions.

Furthermore, a further aim of the present invention is to provide an innovative solution for implementing grounding systems for overhead power line towers which are capable of managing the changing requirements of the electrical system, in particular:
- from a technical-performance perspective, in order to improve performance in the event of lightning strikes to overhead power lines, thus reducing the likelihood of reverse discharge;
- from an environmental perspective, to reduce surface occupation on the ground;
- from a regulatory perspective, in order to comply with the acceptable contact voltages (e.g. European Standard CEI EN 50341-1);
- from a technical-logistical perspective, to provide a modular application solution; and
- from an operative perspective, in order to provide a solution that is not only applicable to new towers, but also to existing ones already in place.

These and other aims are achieved by the present invention in that it relates to a grounding system for overhead power line towers as defined in the appended claims.

In particular, the present invention relates to a grounding system for an overhead power line tower, wherein said tower is anchored to the ground by means of one or more anchorage structures which are at least partially buried. The grounding system is buried and comprises:
- a first ring-type grounding element that is electrically conductive and that
  - is buried at a first predefined depth,
  - extends horizontally around the anchorage structure (s) of the tower,
  - is electrically connected to the tower;
- a second ring-type grounding element that is electrically conductive and that
  - is buried at a second predefined depth deeper than the first predefined depth,
  - extends horizontally around the anchorage structure (s) of the tower,
  - is larger than the first ring-type grounding element,
  - is electrically connected to the first ring-type grounding element via one or more grounding conductors; and
- one or more micropiles that
  - are electrically connected to the second ring-type grounding element,
  - extend vertically or obliquely downwards from said second ring-type grounding element,
  - are configured to act as deep earthing elements.

Preferably, each micropile includes a respective metal tubular structure internally filled externally and covered with a pressure-injected cement mixture and added with one or more conductive inerts having a predefined electric conductivity. Thanks to this feature it is possible to reduce the grounding resistance of the plant.

BRIEF DESCRIPTION OF THE SEVERAL VIEWS OF THE DRAWINGS

In order to better understand the present invention, some preferred embodiments, provided for merely exemplary and non-limiting purposes, will now be illustrated with reference to the enclosed drawings (not in a scale), wherein.

DESCRIPTION OF SPECIFIC EMBODIMENTS OF THE INVENTION

Figure 1:
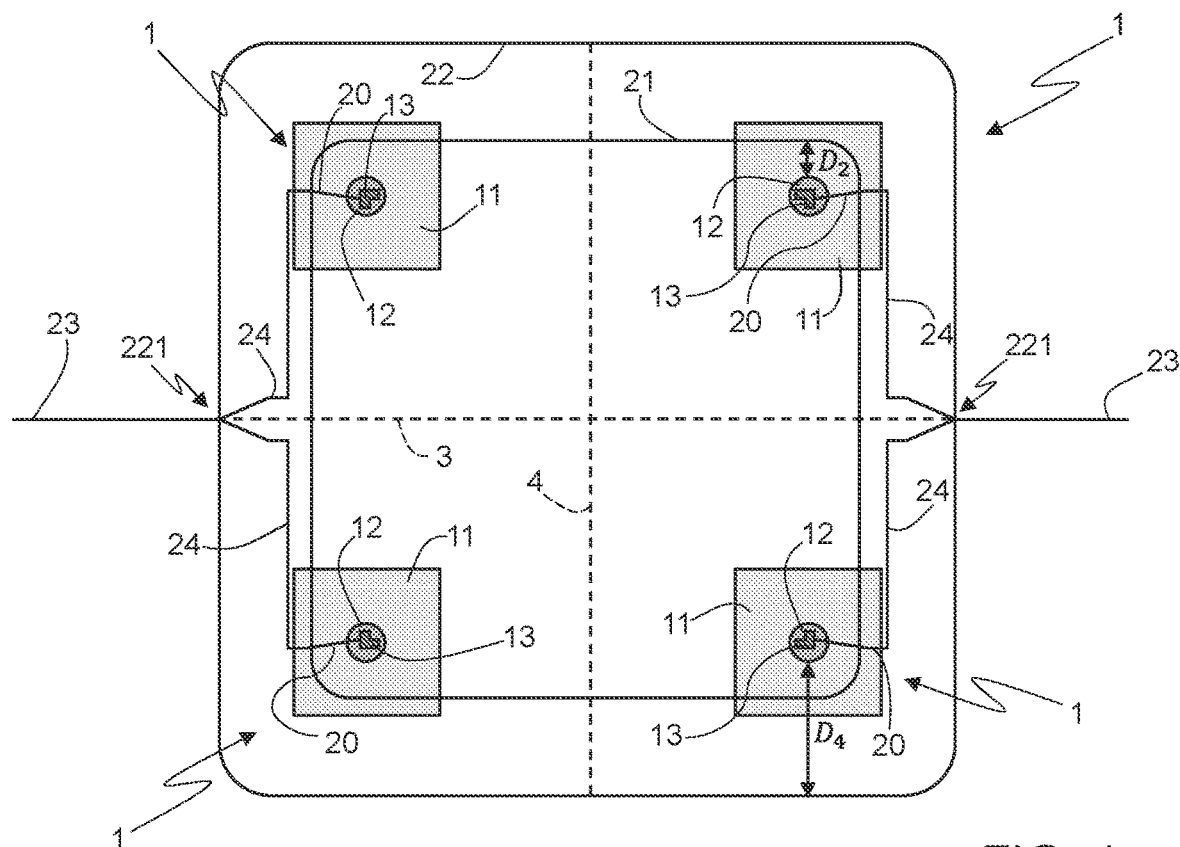
FIGS. 1-3 schematically show a first grounding system according to a preferred embodiment of the present invention.

The following description is provided to enable a person skilled in the art to make and use the invention. Various modifications to the embodiments set forth will be immediately clear to the persons skilled in the art and the general principles herein disclosed may be applied to other embodiments and applications without, however, departing from the protection scope of the present invention as defined in the enclosed claims.

Therefore, the present invention should not be understood as limited to the sole embodiments described and shown, but it must be given the widest scope of protection in accordance with the characteristics defined in the appended claims.

As explained above, the present invention relates to a grounding system for overhead power line towers.

In this respect, it is worth remembering that, as known, an overhead power line tower (e.g. a lattice or tubular tower made of steel or other material) generally includes:

a base anchored to the ground by means of one or more anchorage structures (e.g. in the case of a lattice tower, typically four so-called "foundation feet") which are at least partially buried and capable of (in particular, made so as to) transfer structural loads from the tower to the subsoil;

a head portion for anchoring and mechanically supporting the overhead power line conductors; and a body (or trunk) which extends between the base and the head portion.

Referring, therefore, to a general overhead power line tower of the aforesaid type, the grounding system according to the present invention includes:

a first ring-type grounding element (i.e. having the shape of a ring or broken/curved/mixed single closed line, i.e. not twisted, or the like) which is electrically conductive that is buried at a first predefined depth, extends horizontally around the anchorage structure (s) of the tower and is electrically connected to said tower (e.g. by one or more base grounding conductors);

a second ring-type grounding element (i.e. in the form of a ring or broken/curved/mixed single closed line, i.e. not twisted, or the like) which is electrically conductive that is buried at a second predefined depth deeper than the first predefined depth, extends horizontally around the anchorage structure (s) of the tower, is larger/greater, i.e. has larger dimensions, than the first ring-type grounding element and is electrically connected to the first ring-type grounding element (e.g. via one or more grounding conductors); and one or more micropiles that are electrically connected to the second ring-type grounding element, extend vertically or obliquely downwards from said second ring-type grounding element and are configured to work/act as deep earthing elements.

In view of the foregoing, it is important to note that the grounding system according to the present invention has a modular-type structure (or, in equivalent terms, is based on an architecture), wherein:

the first ring-type grounding element and the second ring-type grounding element that are electrically connected to each other form a double ring grounding structure which is the basic module of this modular structure/architecture;

said basic module is suitably integrated with one or more deep earthing elements (DDP) made by means of micropiles;

the number, length and inclination of the micropiles may be conveniently determined according to the electrical characteristics of the installation site, such as the electrical resistivity of the ground, the keraunic level of the area (i.e., annual number of lightning strikes per $km^2$) and the height of the overhead power line towers.

A technical solution having great versatility for all installation sites is thereby obtained.

For a better understanding of the grounding system according to the present invention, some preferred (but by no means limiting or binding) embodiments of said grounding system will be described below, making explicit reference, merely for ease of description, to lattice-type towers, without however losing generality. Indeed, it is important to underline that the present invention may also be advantageously used, mutatis mutandis, with other types of overhead power line towers such as, for example, tubular towers (made of steel or other material).

In addition, in the following description, for the sake of brevity, the first and second ring-type grounding elements will be referred to as "first perimeter ring" and "second perimeter ring" respectively.

Figure 2:
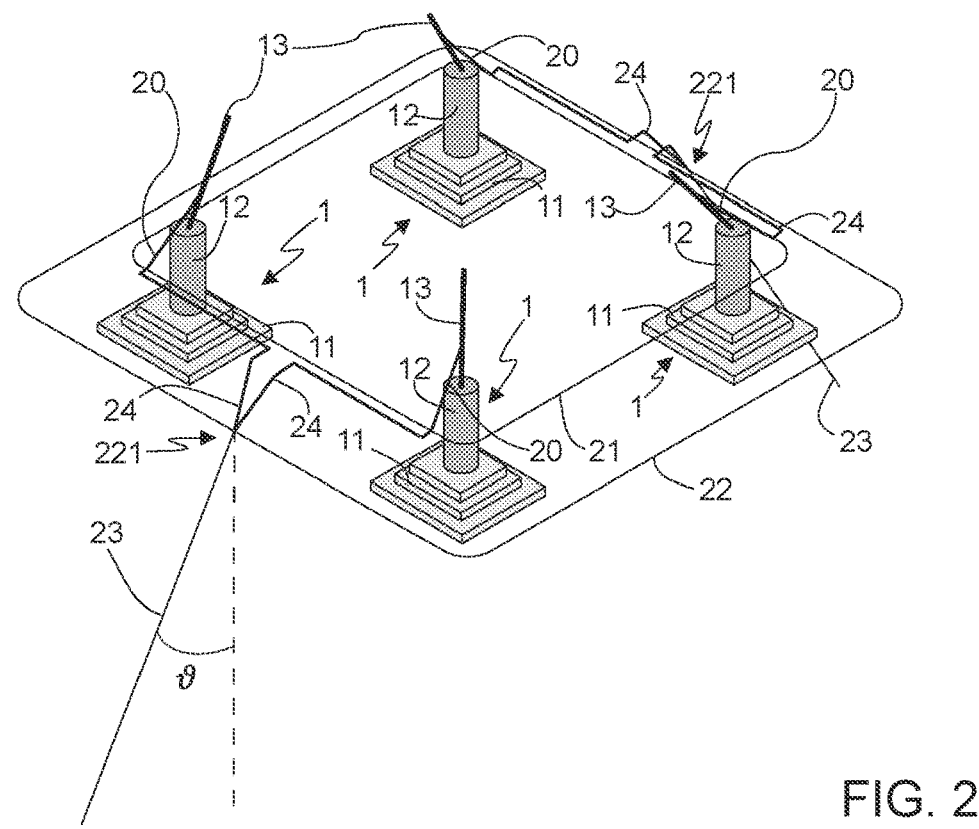
Figure 3:
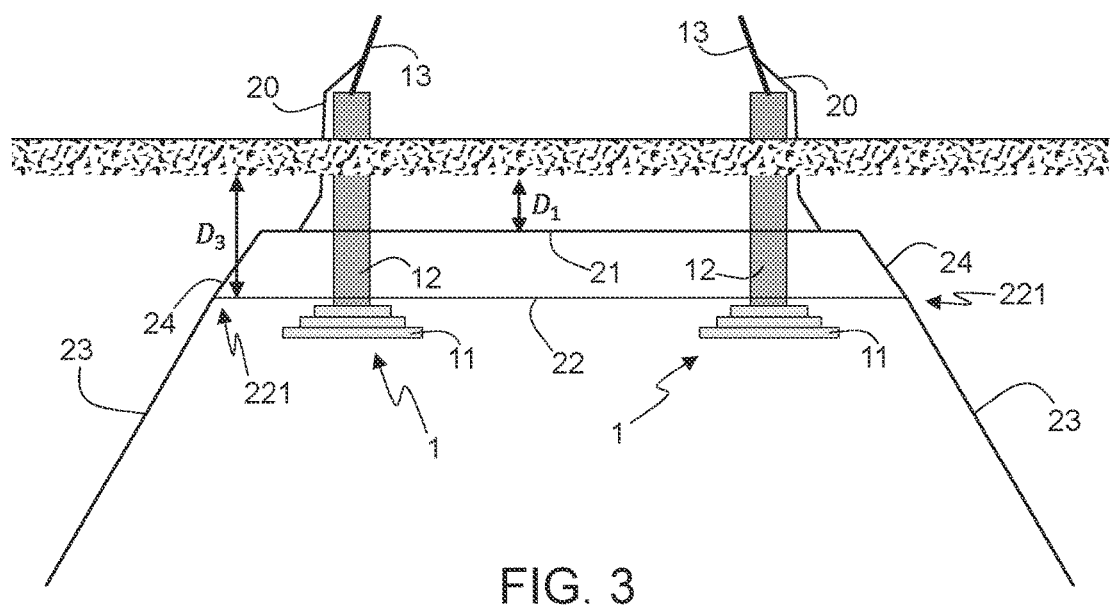

FIGS. 1-3 schematically show a first grounding system according to a preferred embodiment of the present invention.

In particular, FIG. 1 is a plan view, with parts removed for clarity and parts schematized, of the foundations of a lattice tower of an overhead power line provided with the first grounding system, FIG. 2 is a perspective view, with parts removed for clarity and parts schematized, of the foundations of the tower and of the first grounding system, while FIG. 3 is a side view, with parts removed for clarity and parts schematized, of said foundations and said first grounding system.

More specifically, FIGS. 1-3 schematically show four foundation feet 1 of the lattice tower (not shown) buried and arranged horizontally at the vertices of a square having:

a first axis of symmetry 3 that
  corresponds to a longitudinal axis (i.e. a direction of longitudinal extension) of the power line (and will therefore be hereinafter referred to as line axis 3 for the sake of brevity) and
  passes through the midpoints of two opposite sides of said square which are transversal/orthogonal to the line axis 3; and
a second axis of symmetry 4 that
  is perpendicular to the line axis 3 (and will therefore be hereinafter referred to as the transversal axis 4 for the sake of brevity) and
  passes through the midpoints of the other two sides (opposite to each other) of the square, which are, by contrast, parallel to the line axis 3.

Each foundation foot 1 includes:

a respective base 11 substantially in the form of a stepped pyramid (e.g. made by means of reinforced concrete slabs having base dimensions decreasing from bottom to top); and a respective column 12, typically of circular cross-section, extending vertically upwards from the respective base 11 and wherein a respective post 13 of the base of the tower is embedded.

As shown in FIGS. 1-3, the first grounding system includes:

a first perimeter ring 21 buried at a first depth $D_1$ extending horizontally around the columns 12 at a first distance $D_2$ from the latter (in particular, conveniently placed at a first depth $D_1 \approx 0.7$ m with respect to the finished plane and at a first distance $D_2 \approx 1$ m from the columns 12), wherein said first perimeter ring 21 has a substantially square shape with rounded vertices arranged at the foundation feet 1, whereby the line axis 3 and the transversal axis 4 result as axes of symmetry also of said first perimeter ring 21;

a second perimeter ring 22 larger than the first perimeter ring 21, buried at a second depth $D_3$, which extends horizontally around the columns 12 at a second distance $D_4$ from the latter (in particular, conveniently arranged at a second depth $D_3 \approx 2.1$ m with respect to the finished plane and at a second distance $D_4 \approx 3$ m from the columns 12), wherein also said second perimeter ring 22 has a substantially square shape with rounded vertices arranged at the foundation feet 1, whereby the line axis 3 and the transversal axis 4 result as axes of symmetry also of said second perimeter ring 22;

two first micropiles 23 that
  are configured to act as deep earthing elements (DDP),
  are arranged symmetrically and on sides opposite with respect to the transversal axis 4 at two first opposite points 221 of the second perimeter ring 22 arranged along the line axis 3 (consistent, moreover, with the typical right of way—having a width of about 1 metre—provided for overhead power lines),
  are electrically connected to the second perimeter ring 22 and
  extend obliquely downwards from the second perimeter ring 22 (in particular, with a inclination angle $\vartheta \leq 45°$ with respect to the local vertical) along the line axis 3, externally with respect to said second perimeter ring 22; and two pairs of first grounding conductors 24 which are arranged symmetrically and on sides opposite to the transversal axis 4, wherein
  said first grounding conductors 24 electrically connect the first perimeter ring 21 and the second perimeter ring 22,
  each first grounding conductor 24 is connected to the first perimeter ring 21 at a respective foundation foot 1 (at which, moreover, the first perimeter ring 21 is also connected to the post 13 embedded in said foundation foot 1 by means of a respective grounding conductor 20),
  the first grounding conductors 24 of each pair are connected to the second perimeter ring 22 at a respective one of the two first opposite points 221 of said second perimeter ring 22.

Conveniently, the first perimeter ring 21 and the second perimeter ring 22 may each be made by means of a respective conductor, such as a respective copper rope or a respective steel strip of suitable cross-section.

The same can be conveniently applied not only to the base grounding conductors 20 but also to the first grounding conductors 24, i.e. each one of these first grounding 24 may be conveniently made by means of a conductors respective copper rope or a respective steel strip of suitable cross-section.

Preferably, the two first micropiles 23 have the same length, which may be conveniently between 18 m and 36 m.

Conveniently, the first two micropiles 23 may be made by means of hot-dip galvanised steel tubes with a diameter greater than or equal to 60 mm, thickness greater than or equal to 3 mm, filled with a pressure-injected cement mixture.

Conveniently, for the first grounding system, the Applicant has defined two specific preferred configurations named "DDP1" and "DDP2" respectively, wherein:
  in the DDP1 configuration, the first two micropiles 23 are 18 m long; while,
  in the DDP2 configuration, the first two micropiles 23 are 36 m long.

In this respect, it is worth noting that the double-ring structure formed by the first perimeter ring 21, the second perimeter ring 22 (as well as the first grounding conductors 24) has been named by the Applicant as "DDP0" configuration.

Figure 4:
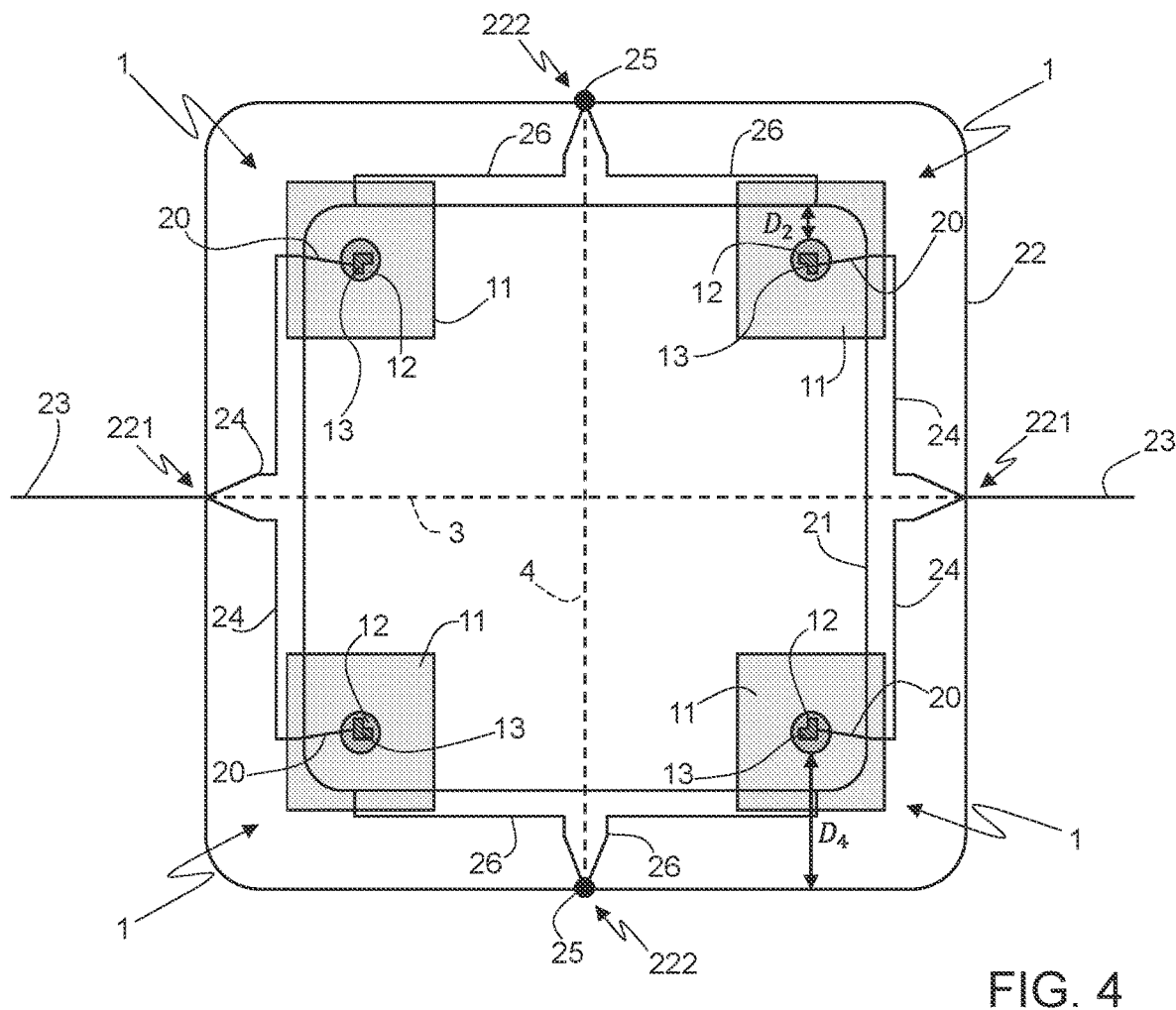
FIGS. 4-6 schematically show a second preferred embodiment of the present invention.
Figure 5:
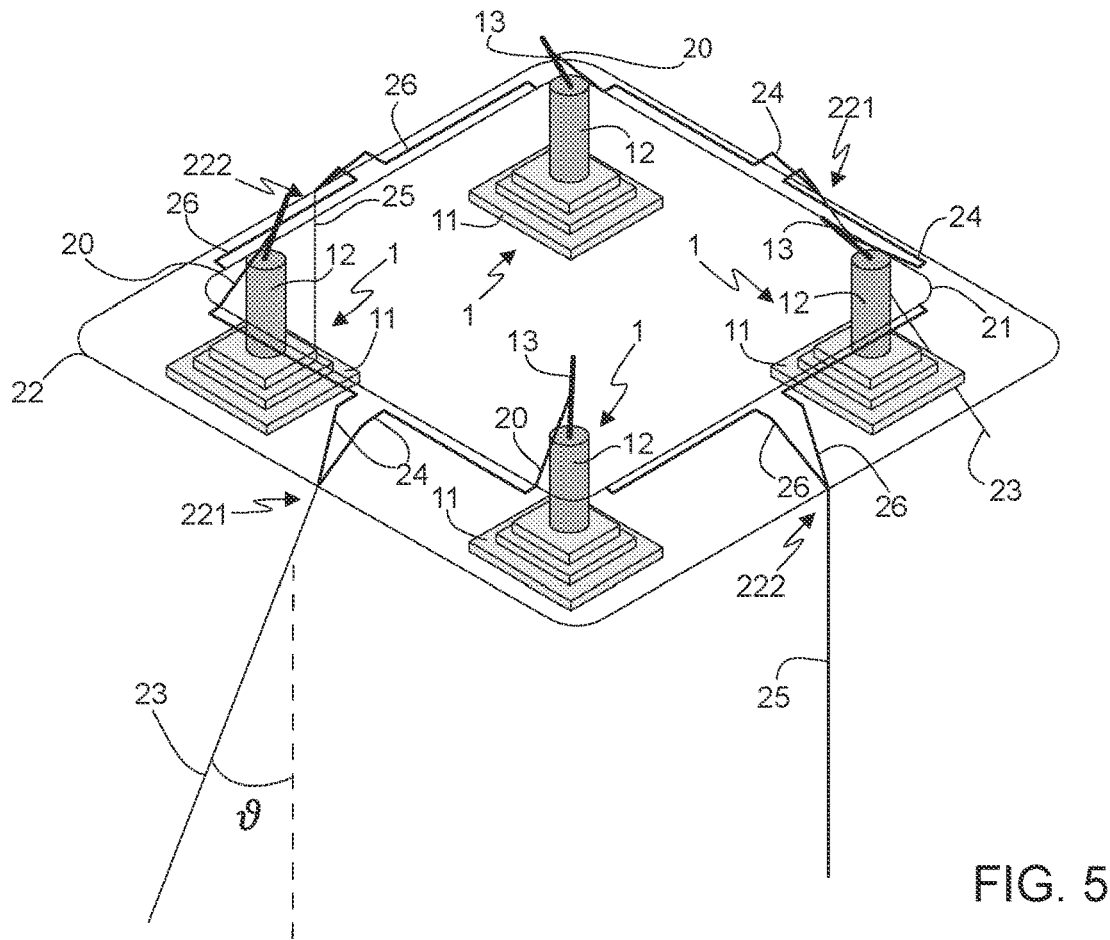
Figure 6:
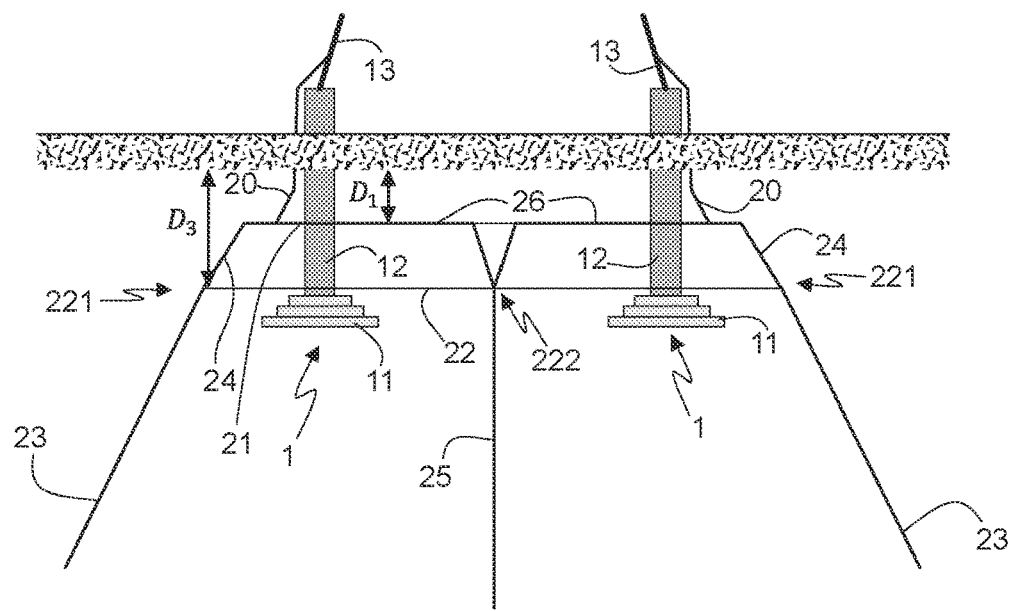

FIGS. 4-6 schematically show a second grounding system according to a second preferred embodiment of the present invention (wherein, similarly to FIGS. 1-3, FIG. 4 is a plan view with parts removed for clarity and parts schematically shown, FIG. 5 is a perspective view with parts removed for clarity and parts schematically shown, and FIG. 3 is a side view with parts removed for clarity and parts schematically shown).

In particular, the second grounding system includes the same elements with the same technical characteristics as the first grounding system shown in FIGS. 1-3 and described above. Therefore, in FIGS. 4-6, the same reference numbers are used to indicate the same elements already shown in FIGS. 1-3 (either of the first grounding system and of the foundations of the lattice tower). In addition, for the sake of brevity, the elements and technical characteristics already described above in relation to the first grounding system will not be described anew in relation to the second grounding system, remaining valid what has already been described previously in this respect.

As shown in FIGS. 4-6, compared to the first grounding system, the second grounding system also includes:
- two second micropiles 25 that
  - are configured to act as additional DDPs,
  - are arranged symmetrically and on opposite sides of the line axis 3 at two second opposite points 222 of the second perimeter ring 22 arranged along the transversal axis 4,
  - are electrically connected to the second perimeter ring 22 and
  - extend vertically downwards from the second perimeter ring 22; and
- two pairs of second grounding conductors 26 which are arranged symmetrically and on opposite sides with respect to the line axis 3, wherein
  - said second grounding conductors 26 electrically connect the first perimeter ring 21 and the second perimeter ring 22,
  - each second grounding conductor 26 is connected to the first perimeter ring 21 at a respective foundation foot 1,
  - the second grounding conductors 26 of each pair are connected to the second perimeter ring 22 at a respective one of the two opposite second points 222 of said second perimeter ring 22.

Conveniently, each of the second grounding conductors 26 may be made by means of a respective copper rope or a respective steel strip of suitable cross-section.

Preferably, the first and second micropiles 23, 25 have the same length, which may be conveniently between 18 m and 36 m.

Conveniently, the two second micropiles 25 may also be made from hot-dip galvanised steel tubes, with a diameter of 60 mm or more, thickness of 3 mm or more, filled with a pressure-injected cement mixture.

Conveniently, for the second grounding system, the Applicant has defined three specific preferred configurations named "DDP3", "DDP4" and "DDP5" respectively, wherein:
- in the DDP3 configuration, the first and second micropiles 23, 25 are 18 m long;
- in the DDP4 configuration, the first and second micropiles 23, 25 are 27 m long;
- in the DDP5 configuration, the first and second micropiles 23, 25 are 36 m long.

Figure 7:
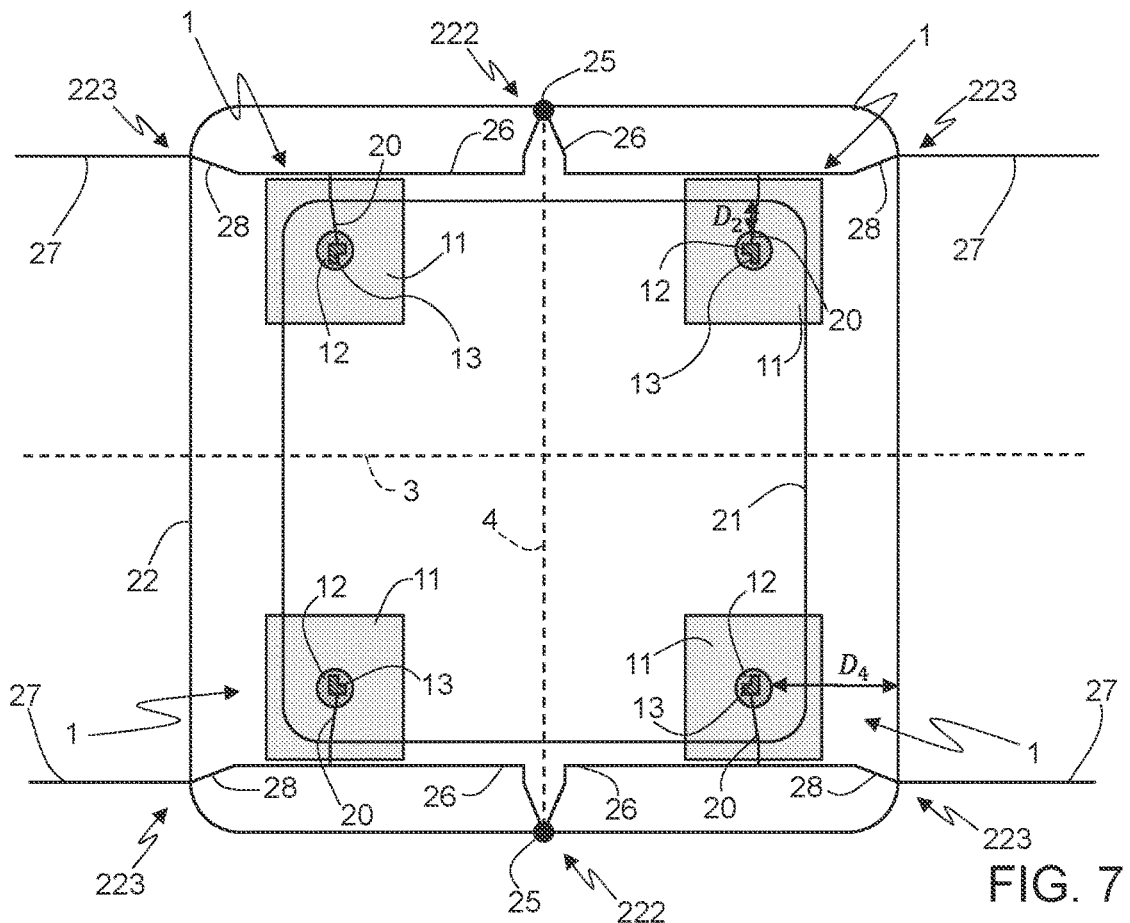
FIGS. 7-9 schematically show a third preferred embodiment of the present invention.
Figure 8:
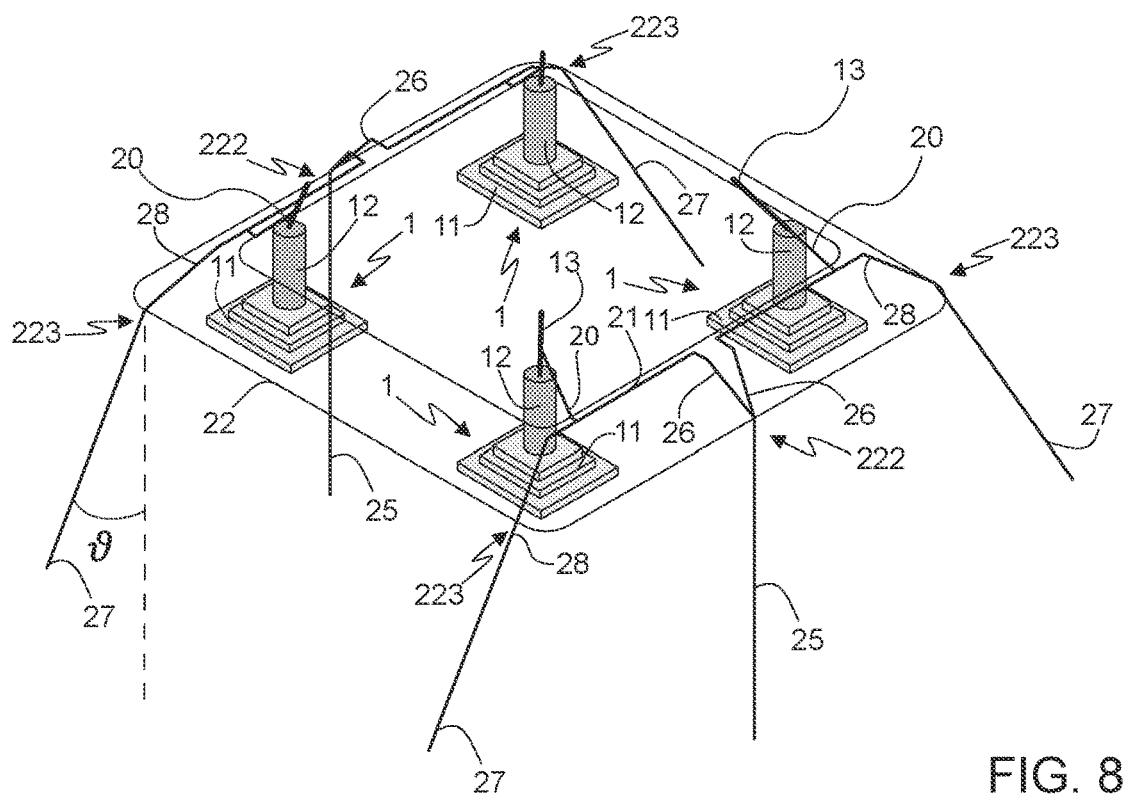
Figure 9:
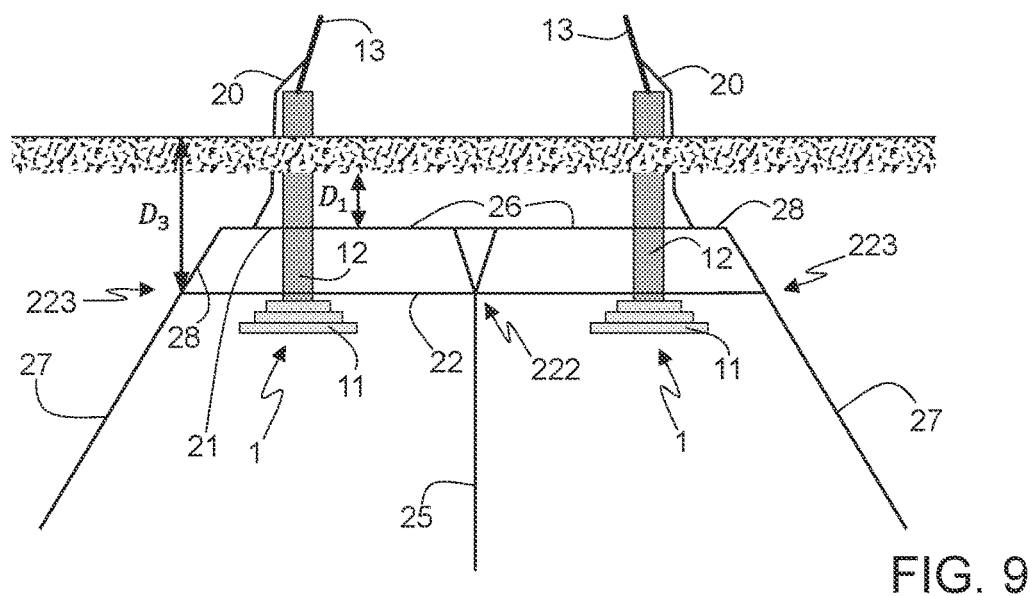

FIGS. 7-9 schematically show a third grounding system according to a third preferred embodiment of the present invention (wherein, similarly to FIGS. 1-3 and 4-6, FIG. 7 is a plan view with parts removed for clarity and parts schematically shown, FIG. 8 is a perspective view with parts removed for clarity and parts schematically shown, and FIG. 9 is a side view with parts removed for clarity and parts schematically shown).

In particular, similarly to the first and second grounding systems, also the third grounding system includes the first and second perimeter rings 21, 22 (thereby the relevant reference numbers are also used in FIGS. 7-9, while, for the sake of brevity, the relevant technical characteristics will not be described anew, remaining valid what has already been described previously in this respect).

In addition, as with the second grounding system, the third grounding system also includes the second micropoles 25 and the second grounding conductors 26 (so the relevant reference numbers are also used in FIGS. 7-9, while, for the sake of brevity, the relevant technical characteristics will not be described anew, remaining valid what has already been described above in this respect).

Unlike the first and second grounding systems, the third grounding system does not include the first micropiles 23 nor the first grounding conductors 24, but comprises:
- two pairs of third micropiles 27 which are arranged symmetrically and on opposite sides with respect to the transversal axis 4, wherein the third micropiles 27 of each pair
  - are configured to act as DDPs,
  - are arranged symmetrically and on opposite sides of the line axis 3, each at a respective third point 223 of the second perimeter ring 22,
  - are electrically connected to the second perimeter ring 22 and
  - extend obliquely downwards from the second perimeter ring 22 (in particular, at an inclination angle $\vartheta \leq 45°$ with respect to the local vertical) externally with respect to said second perimeter ring 22 and parallelly to the vertical plane passing through the line axis 3; and
- two pairs of third grounding conductors 28 which are arranged symmetrically and on sides opposite to the transversal axis 4, wherein
  - said third grounding conductors 28 electrically connect the first perimeter ring 21 and the second perimeter ring 22,
  - each third grounding conductor 28 is connected to the first perimeter ring 21 at a respective foundation foot 1,
  - the third grounding conductors 28 of each pair are arranged symmetrically and on sides opposite to the line axis 3 and are connected to the second perimeter ring 22 at a respective one of the third points 223 of said second perimeter ring 22.

Conveniently, each one of the third grounding conductors 28 may also be made by means of a respective copper rope or a respective steel strip of suitable cross-section.

Preferably, the second and third micropiles 25, 27 have the same length, which may be conveniently between 18 m and 36 m.

Conveniently, the third micropiles 27 may also be made by means of hot-dip galvanised steel tubes, with a diameter greater than or equal to 60 mm, thickness greater than or equal to 3 mm, filled with a pressure-injected cement mixture.

Conveniently, for the third grounding system, the Applicant has defined a specific preferred configuration called "DDP6", wherein the second and third micropoles 25, 27 are 36 m long.

In the light of the foregoing, it is important to draw the attention to the fact that the use, according to the present invention, of a double perimeter ring structure in combination with DDPs implemented by means of micropiles for grounding overhead power line towers is not anticipated, on the one hand, by any known technical solution and allows, on the other hand, to obtain several important technical advantages compared to previous solutions, such as:
- modularity, versatility and ease of implementation;
- high electrical and safety performance in terms of contact and step voltages;
- maximum geometric correspondence between the implemented earthing element and the operationally theoretically designed one;
- mitigation of the risk of damaging the grounding system in operation by third parties;
- maximum environmental sustainability;
- mitigation of geotechnical interferences with existing foundations;

low electrical impedance of the grounding system of the tower at both low and high frequencies.

Referring specifically to the use, according to the present invention, of micropiles as DDPs, it is worth noting that micropiles are typically used in the civil/building engineering sector as structural foundation elements (being able to withstand significant mechanical loads and reach considerable lengths), while no solutions are known wherein they have been used specifically as deep earthing elements (DDPs) in grounding systems.

Figure 10:
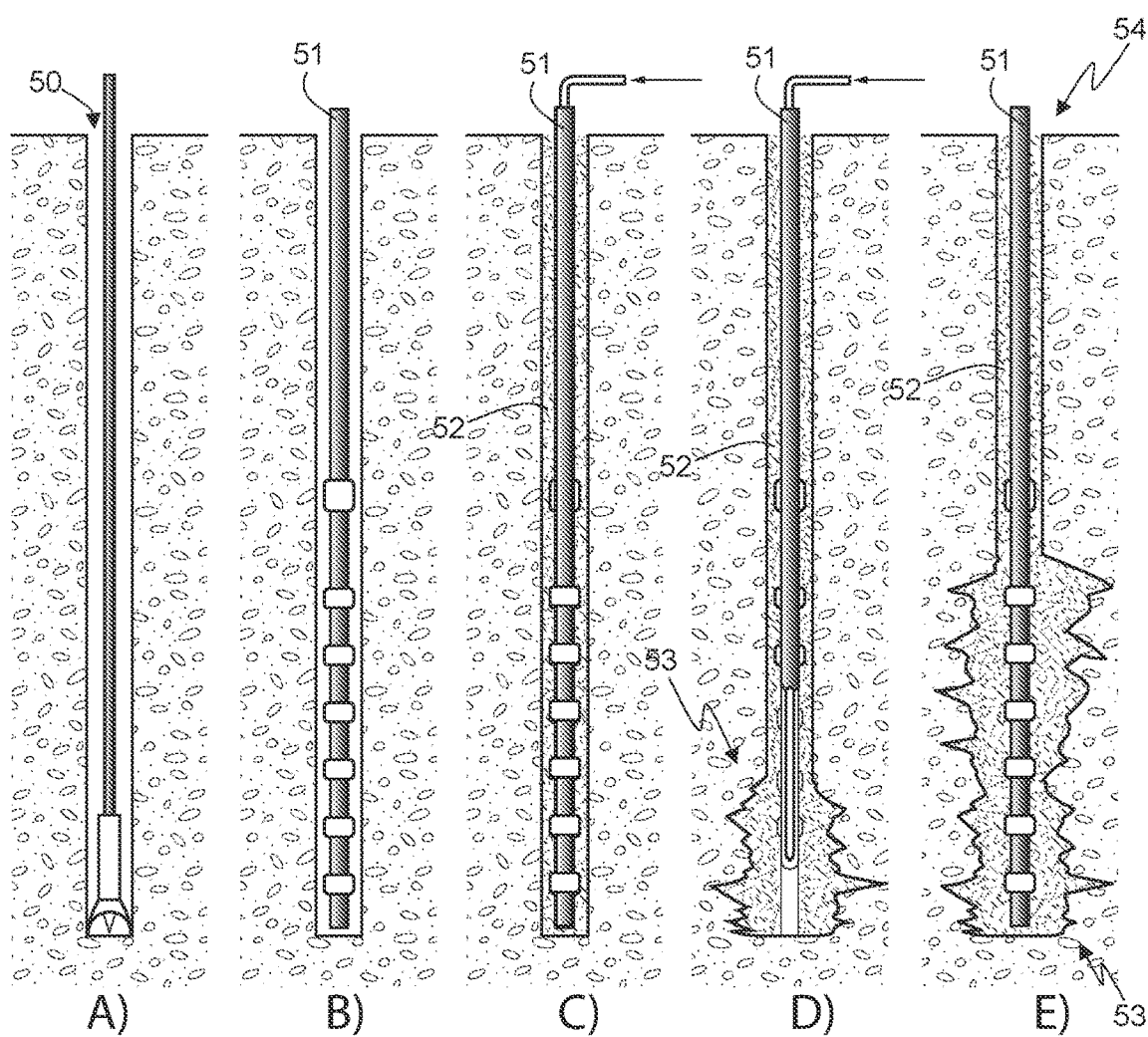
FIG. 10 schematically shows an embodiment of a deep earthing element by means of a micropile technique according to a preferred embodiment of the present invention.

FIG. 10 schematically shows a process for implementing a DDP by a micropile technique according to a preferred (but by no means limiting or binding) embodiment of the present invention, said process comprising:
- a) a step of drilling the ground;
- b) laying or inserting a metal tube 51, preferably made of steel, in a hole 50 made in the ground in step a);
- c) pressure injecting, inside the metal tube 51, a cement mixture which, exiting from a lower end of the metal tube 51 (and/or from holes present along said metal tube 51), rises upwards spreading in the surrounding tube-ground gaps adhering to the cylindrical side surface of the metal tube 51 and wrapping it externally, thus creating an external sheath/sleeve 52, as well as a strong interaction with the ground in which the micropile is installed; and, finally,
- d-e) forming, by pressure injecting a cement mixture, a bulb 53 around the lower end of the metal tube 51, wherein said bulb 53 is characterised by a diameter larger than the outer sleeve 52 (and may conveniently have variable vertical dimensions)—thereby, the creation of the micropile (globally denoted by 54) is completed.

As is known, micropiles may be made with different inclinations (typically up to 45°) and, thanks to the use of several tube elements connected together by means of appropriate joints, may reach variable overall lengths. Thanks to this last feature, micropiles used as DDPs according to the present invention may be made with different lengths defined based on the electrical characteristics of the installation site.

Thanks to the use, according to the present invention, of micropiles with DDP function, several technical advantages are obtained:
- modularity in terms of length; unlike traditional stakes, whose length is limited for mechanical and installation reasons, micropiles are, as just explained, modular in length according to the electrical characteristics of the installation site and, above all, may be made to the desired required length;
- modularity in terms of inclination; in fact, for mechanical reasons, the traditional stakes typically used in grounding plants cannot have considerable lengths for inclined insertions, whereas micropiles may be buried at variable angles of up to 45° while still ensuring considerable lengths (e.g., ≥36 m); furthermore, the inclination of micropiles up to 45° makes it possible to mitigate inductive thus ensuring better couplings, electrical performance in terms of a reduced value of impulse resistance (or rather of high-frequency impedance);
- modularity in terms of diameter; unlike traditional stakes, which have to be small in diameter in order to be physically inserted into the ground, micropiles allow to reach larger diameters (e.g. >100 mm);
- simple and quick installation; in fact, the equipment and machinery used for installing micropiles are small, easy to handle and suitable for use in almost any logistic or ground situations; installing micropiles is quick and easy even in cohesive grounds, or with the presence of rocks, regardless of the length and inclination of the micropiles;
- resilience to climatic conditions; in fact, the use of DDPs made by micropiles (and therefore of considerable length), therefore with an operating result equal to the theoretical design scheme, makes it possible to intercept layers of ground with more stable humidity, less affected by the surface environmental conditions, thus guaranteeing lower values of electrical resistivity and, therefore, of low and high frequency impedance;
- resilience to anthropogenic factors; in fact, the use of DDPs, made by micropiles placed close to the towers and starting from a depth of no less than 2.1 m from ground level, makes it possible to minimise the risk of damaging agricultural areas, with full working functionality of the plant even in a context of mechanization of agricultural work.

Micropiles traditionally used in the civil/construction engineering sector as structural elements of foundations are filled under pressure with a cement mortar in order to ensure better geo-mechanical stability, strengthening the contact with the surrounding ground.

The external cover of the tube thus formed ensures better physical and mechanical interaction with the surrounding ground, unlike traditional stakes with connectable elements typically used for grounding systems, which constitute a mechanical connection of simple contact between the earthing element and the surrounding ground.

Regarding the electrical interaction of the cement mixture, the use of a traditional cement mixture, characterised by electrical resistivities of the order of 300 $\Omega m$, implies a worsening of the electrical behaviour of the micropile in grounds with low electrical resistivity and, vice versa, a good behaviour only in grounds with high/very high resistivity.

Therefore, in order to further improve the electrical performance of the micropiles used as DDPs, the Applicant has tested and identified a special additive cement mixture which, while being operationally injectable into the micropiles of DDPs, also has a high electrical conductivity due to the presence of suitable conductive inerts.

Thanks to this, the resistivity values of the mixture with these conductive inert are less than 50 $\Omega m$, preferably less than 20 $\Omega m$, so that high performance is ensured for all ranges of electrical resistivity of the ground, i.e. with values of one order of magnitude lower than with a traditional cement mortar.

Figure 11:
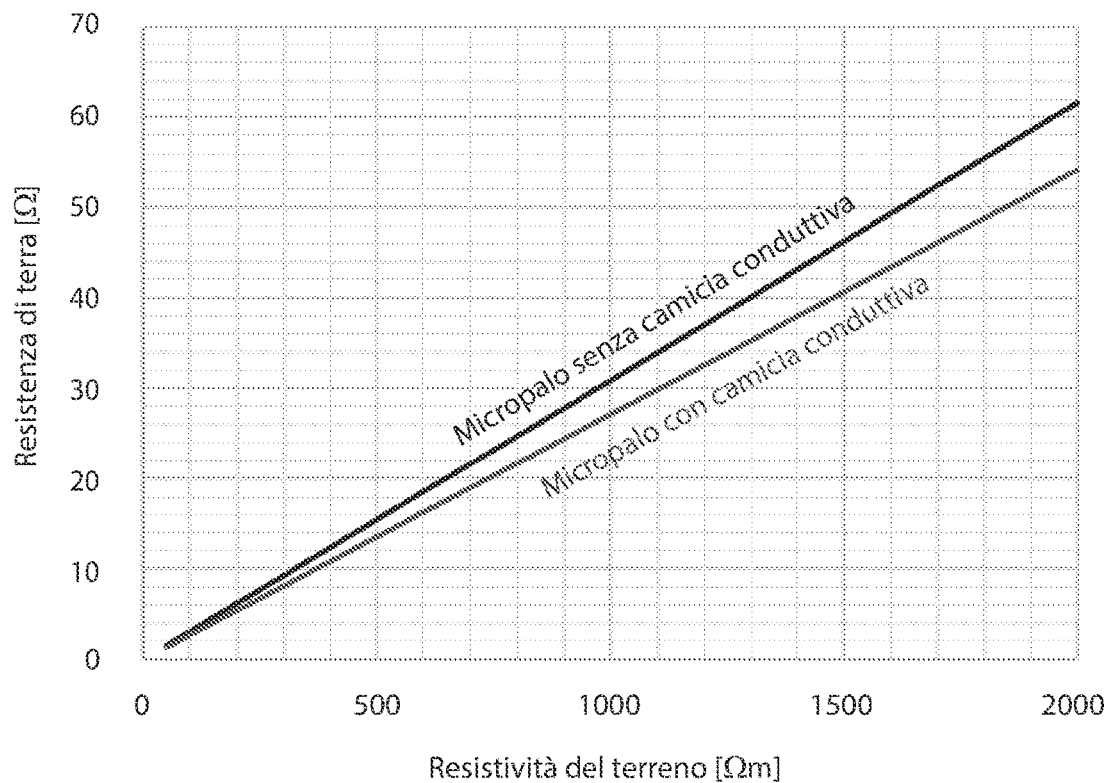
FIGS. 11-15 show experimental results related to the present invention.
Figure 12:
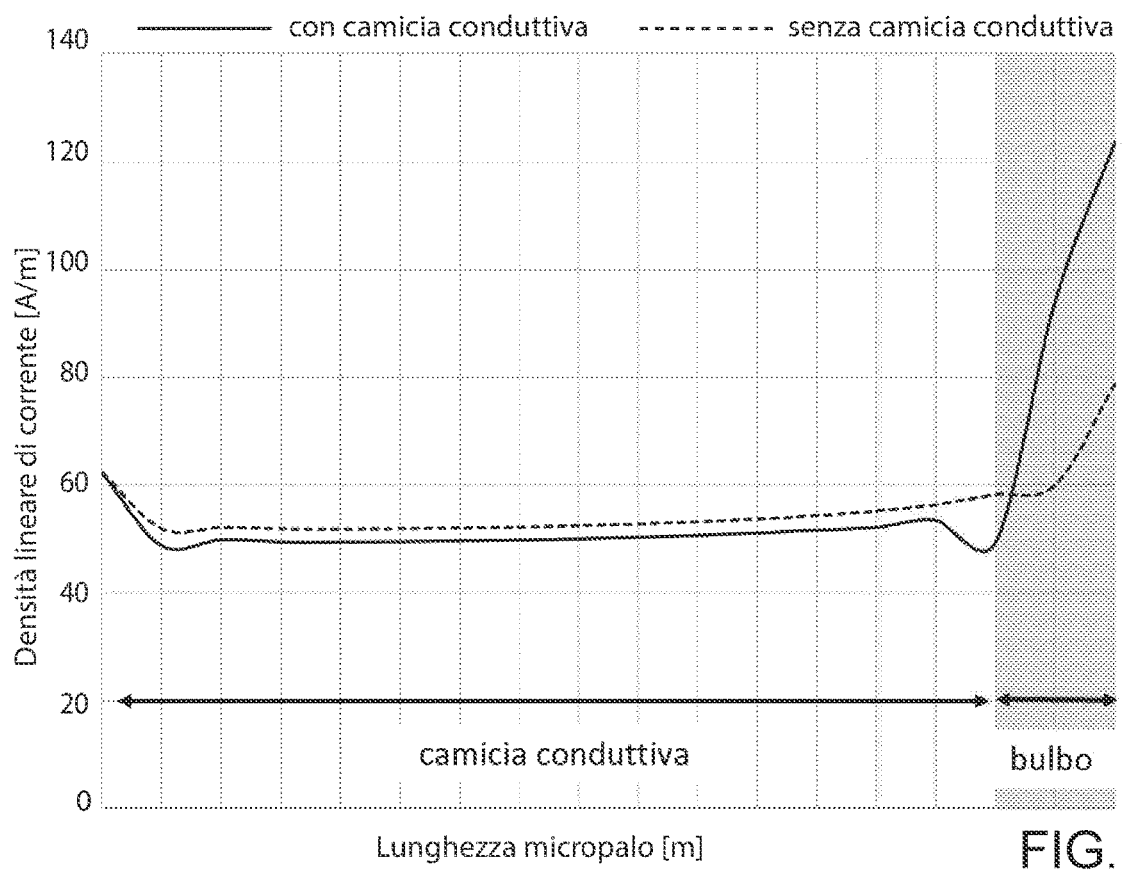

Thereby, in addition to confirming effective protection against the corrosive action of the ground thanks to the formation of the external sleeve, further technical advantages are achieved, such as:
- an increase in the equivalent earthing radius; in fact, forming an external sleeve with high electric conductivity makes it possible to increase the equivalent earthing radius/diameter of the micropile; the effect of such increase is to reduce the impedance of the grounding system, either at low and high frequencies; in this respect, FIG. 11 shows a graphical comparison between the total ground resistances (low frequency impedance) of two 36 m long micropiles, one with a conductive additive mixture jacket and one without it, as the electrical resistivity of the ground varies, wherein it is possible to see that the reduction in electrical resistance expected for the micropile with conductive sleeve is about 12% throughout the range of electrical resistivity of the ground considered;

a thorough contact with the ground; in fact, pressure injecting a conductive additive mixture allows to create a conductive sleeve that makes the DDP immediately effective, making it interact almost as if it were a single body with the surrounding ground, in other words, eliminating the discontinuities between the two elements, ground and micropile, and thus improving electrical performance;

finally, forming the bulb with the additive-enriched conductive mixture, at the end of the micropile, makes it possible to disperse a greater electric current in this area, while reducing the linear density of current on the surface of the micropile; in this regard, FIG. 12 shows the trend of the linear density of current (A/m) dispersed in the ground, for a micropile with a conductive sleeve and one without it, as a function of the length (i.e. depth) of the micropile; from FIG. 12 it is also possible to note, in addition to the physical phenomenon of an increase in the linear density at the bulb, an increase in the dispersion capacity at the bulb, in case an additive-enriched cement mixture with high conductivity is used.

Figure 13:
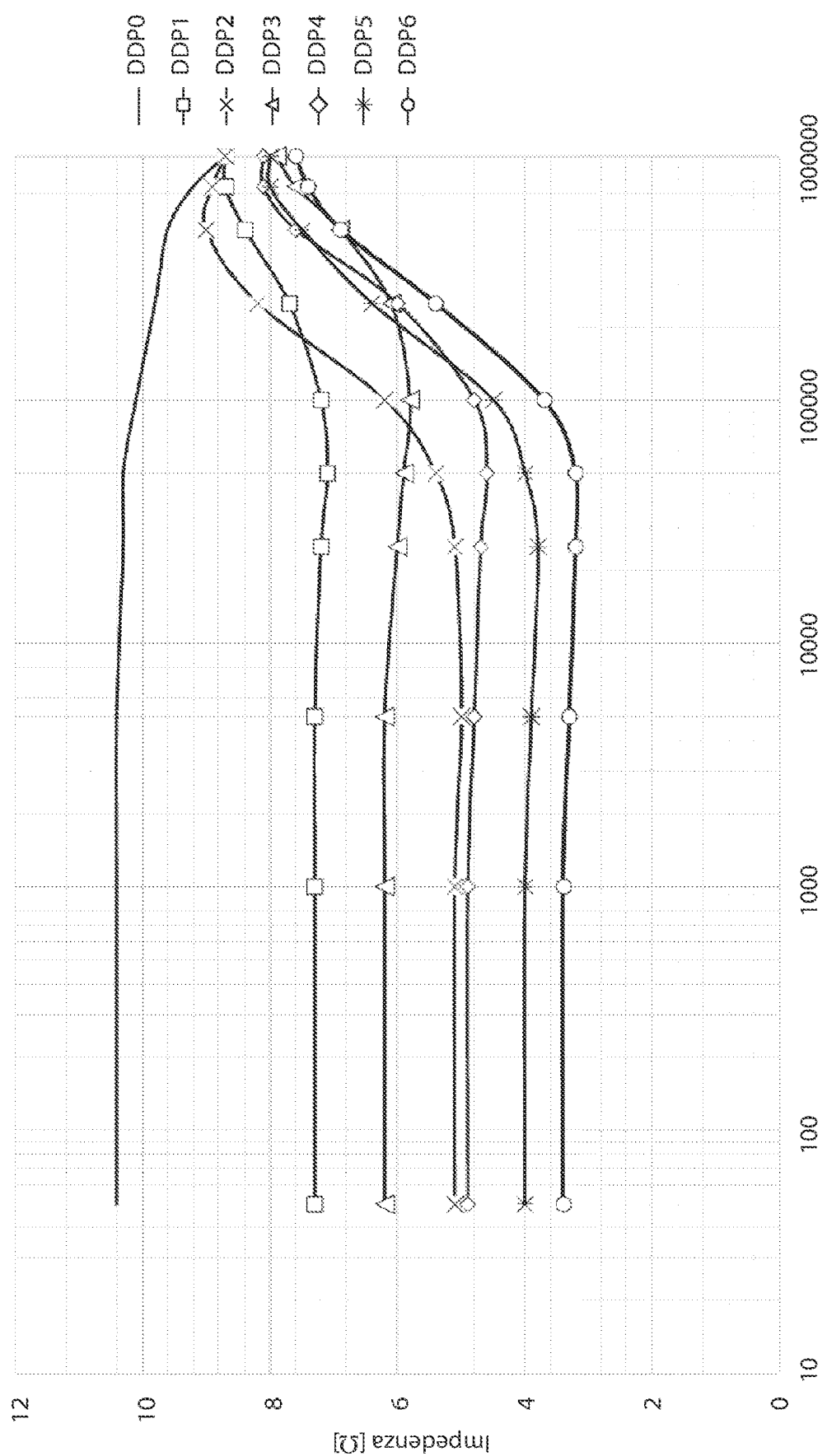
Figure 14:
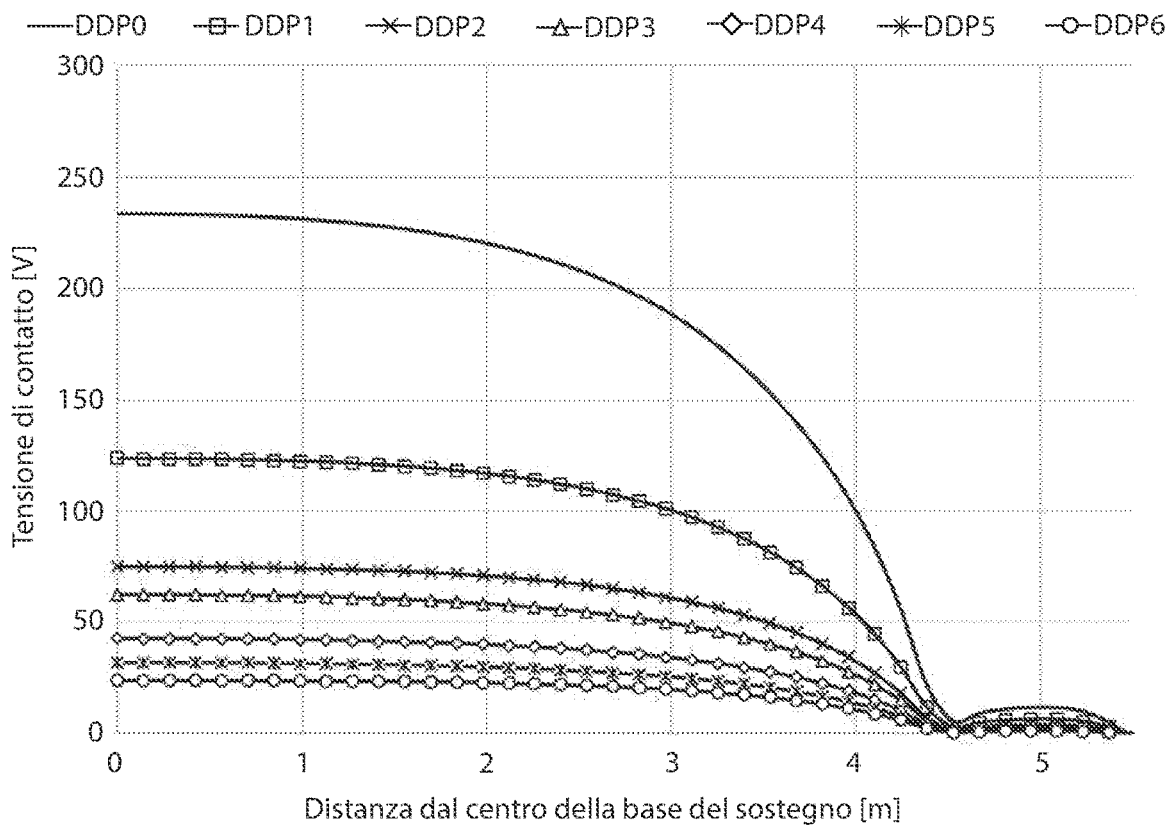
Figure 15:
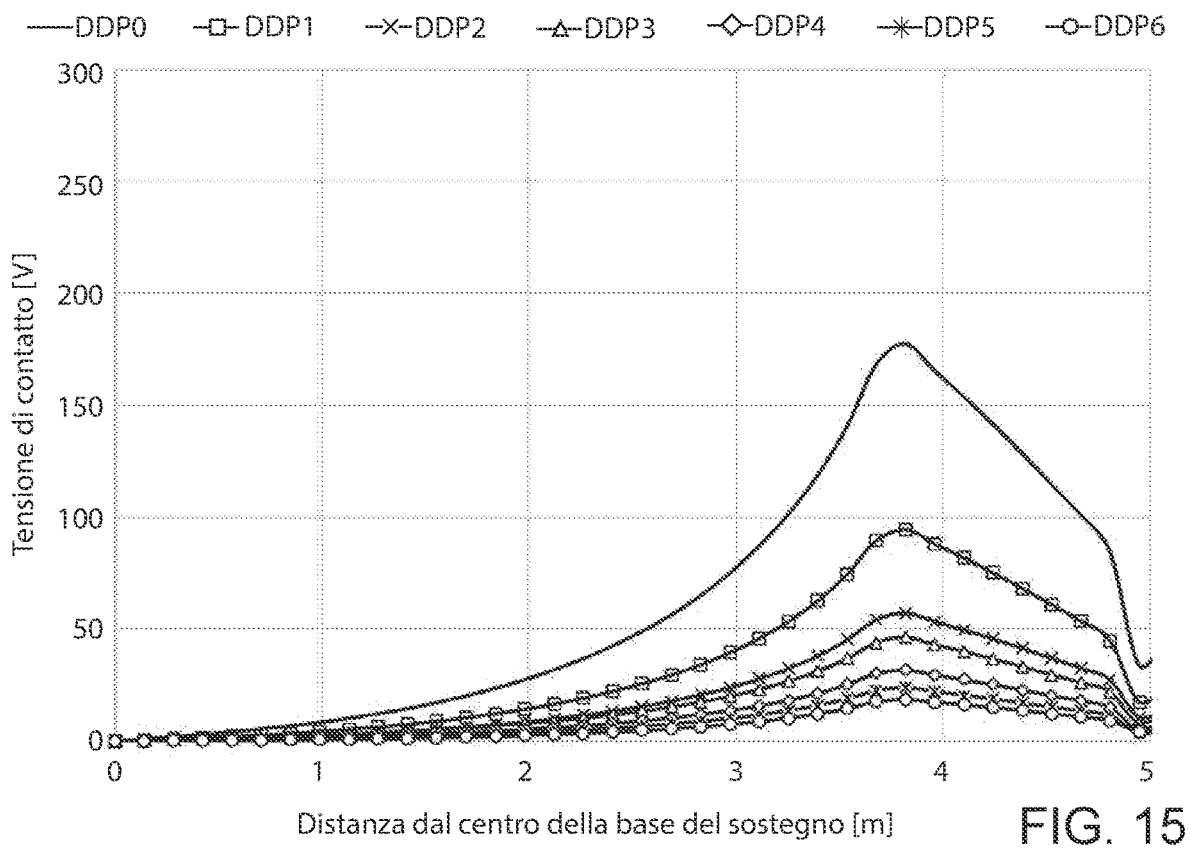

As explained above, the grounding system according to the present invention is based on a modular architecture wherein, starting from a basic module with a double perimeter ring, the system is suitably enriched by DDPs made by means of micropiles, whose number, length and inclination may be determined according to the electrical characteristics of the specific installation site (such as the electrical resistivity of the ground, the keraunic level of the area and the height of the overhead power line towers), thus obtaining a technical solution with great versatility for all installation sites. In particular, the advantages obtained through the modular solution of the present invention are:

an increase in the electrical performance in terms of reduction of the electrical impedance; in fact, the modularity of the grounding system according to the present invention based on the use of micropoles allows to obtain increasingly better electrical performance, in terms of reduction of the electrical impedance, as the length and the number of micropoles used increase; in this respect, FIG. 13 shows the trend of the electrical impedance of the DDP0-DDP6 configurations with the same ground resistivity and frequency variation (in particular, for the diagram in FIG. 13, reference is made to a ground resistivity of 350 Ωm and to a square-based lattice tower with a side of 5 m);

an increase in performance in terms of reduction of contact and step voltages; in fact, the modularity of the grounding system according to the present invention, based on the use of DDPs of the micropile type, makes it possible to obtain increasingly better electrical performance, in terms of reduction of contact and step voltages near the tower, as the length and number of micropiles used increase; in this respect, FIG. 14 shows the trend of the contact voltage as the distance from the centre of the base of a tower increases for the DDP0-DDP6 configurations, assuming a ground resistivity of 350 Ωm, a square-based lattice tower with a side of 5 m and a dispersed current normalised at 1000 A; in addition, FIG. 15 shows the step voltage trend as the distance from the centre of the base of a tower increases for the DDP0-DDP6 configurations, again assuming a ground resistivity of 350 Ωm, a square-based lattice tower with a side of 5 m and a dispersed current normalised at 1000 A.

As is known, the mechanical stability of the foundations of existing towers is related, among other things, to the weight of the ground conoid that weighs down on the foundation feet at an angle of the conoid of between 20° and 30°.

Figure 16:
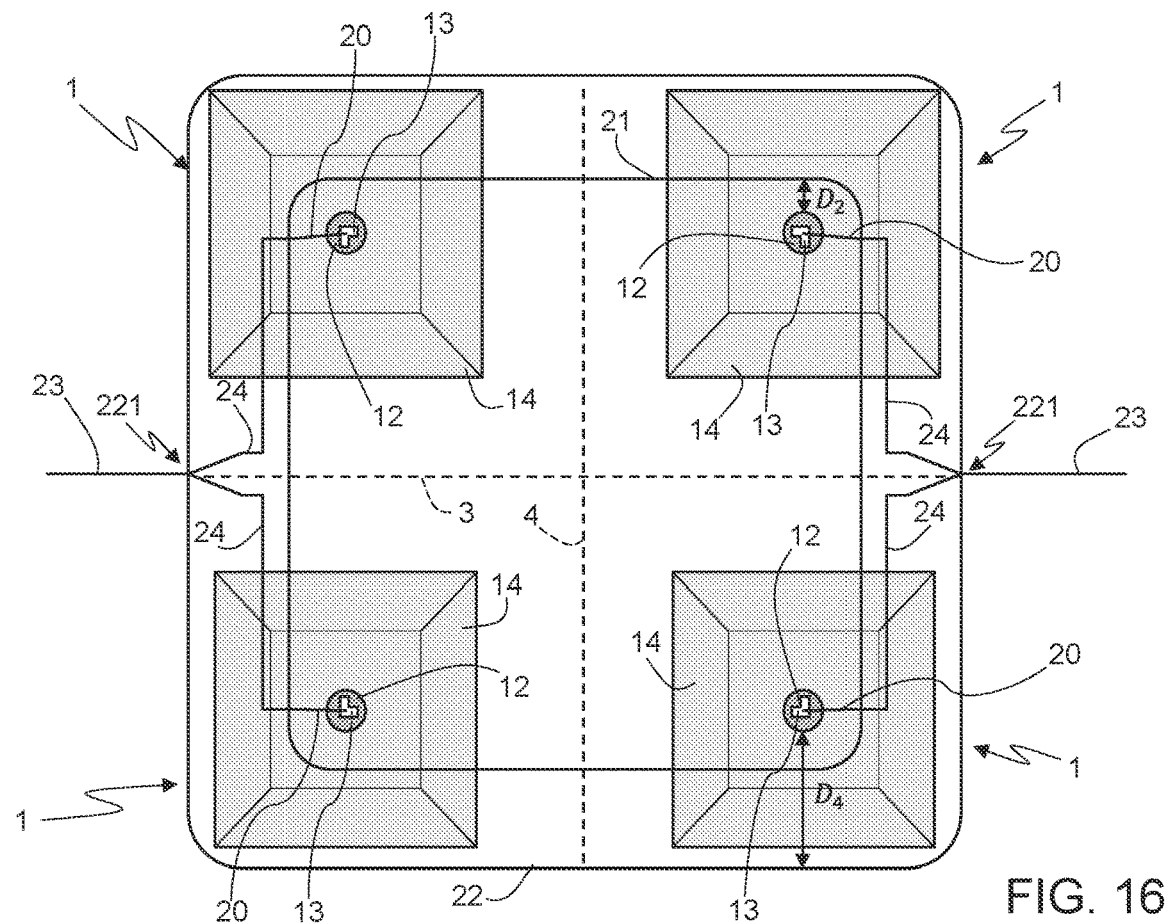
FIGS. 16-18 schematically show the reduced interaction of the first grounding system in FIGS. 1-3 with the foundation conoids of a lattice tower.
Figure 17:
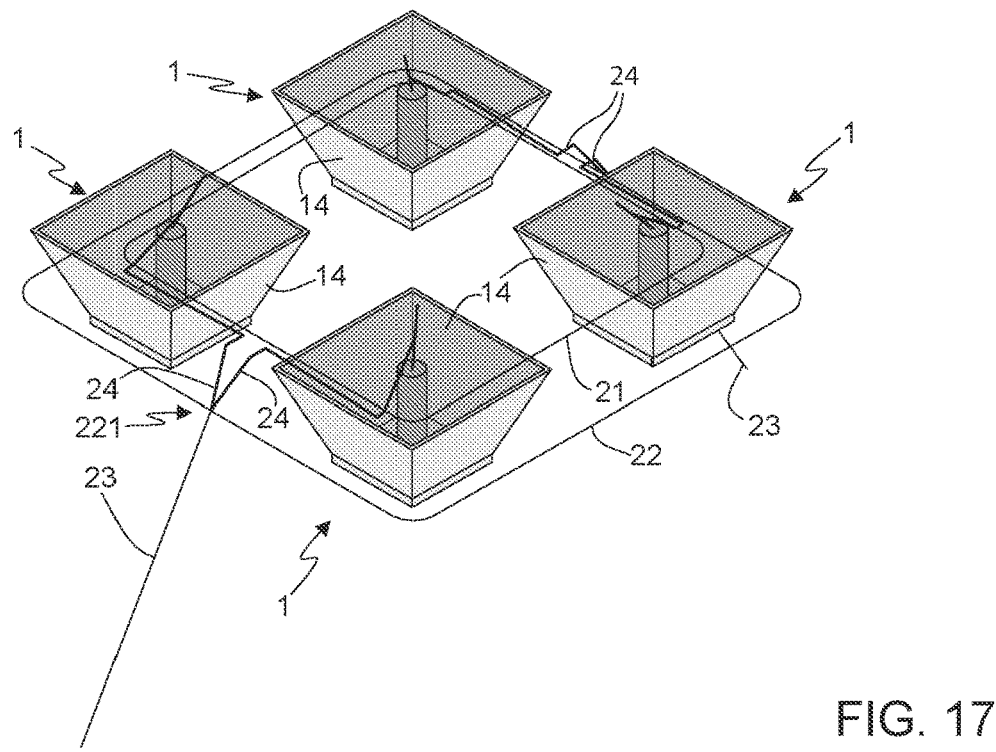
Figure 18:
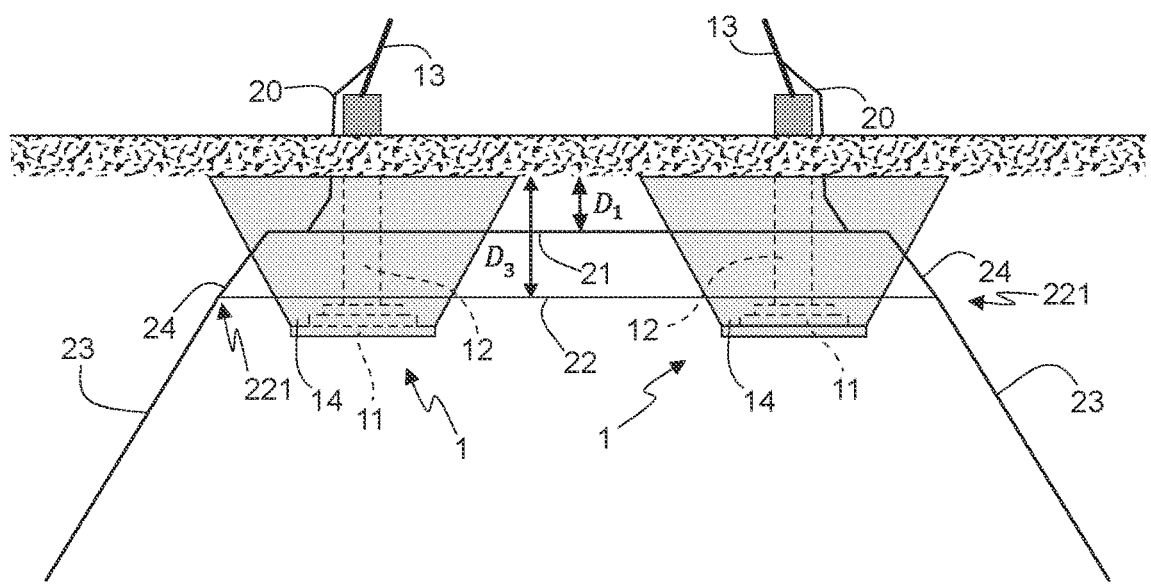

A further advantage of the grounding system of the present invention is that it can also be applied to existing towers, by virtue of the following distinctive features:

unaltered mechanical stability against overturning of the tower object of the intervention; in fact, the grounding system according to the present invention may be advantageously applied also to existing towers since the implementation system does not compromise the mechanical stability of the foundations; in this respect, reference may be made to FIGS. 16-18 which schematically show the minimum interaction of the first grounding system of FIGS. 1-3 (interaction only with the first upper ring 21, but not with the second lower ring 22, nor with the first micropiles 23) with the foundation conoids (denoted by 14) of the foundation feet 1;

preservation of the geotechnical characteristics of the original conoids as they have matured over many years of ground compaction and therefore of the resilience of the line to external mechanical stresses (atmospheric events in general).

As explained above, a well-known and established practice in the design of grounding systems is to use four long counterweights consisting or of steel copper strips/ropes, buried horizontally and connected to the posts of the towers. In order to achieve an ever-improving electrical performance, the counterweights are of increasing lengths of up to 120 m. In some cases, counterweights have even been made long enough to interconnect adjacent grounding systems. All this results in a non-negligible occupation and use of land.

On the other hand, the land occupation associated with the use of the grounding system according to the present invention is independent of the size of the micropiles. In fact, unlike the traditional and well-known solution with counterweights, the area occupied by the grounding system according to the present invention depends exclusively on the base of the tower and the footprint of the first and second ring. In fact, given the dimensions of the base of the tower, as the length of the micropiles and, therefore, of the electrical performance of the grounding system according to the present invention increases, the surface occupied by said system remains constant and equal to about:

$$S=(B+6m)^2,$$

where S indicates the surface occupied and B indicates the size of the side of the base of the tower.

Figure 19:
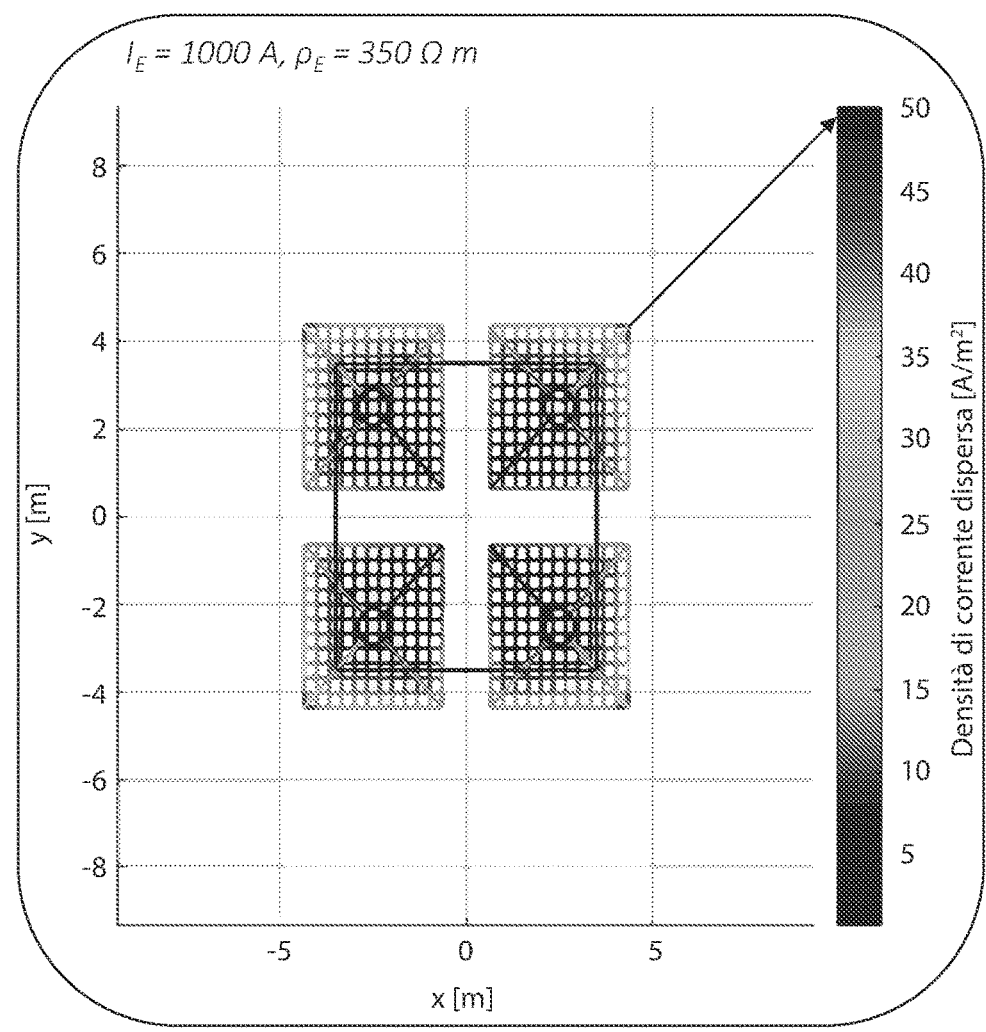
FIGS. 19 and 20 show further experimental results related to the present invention.
Figure 20:
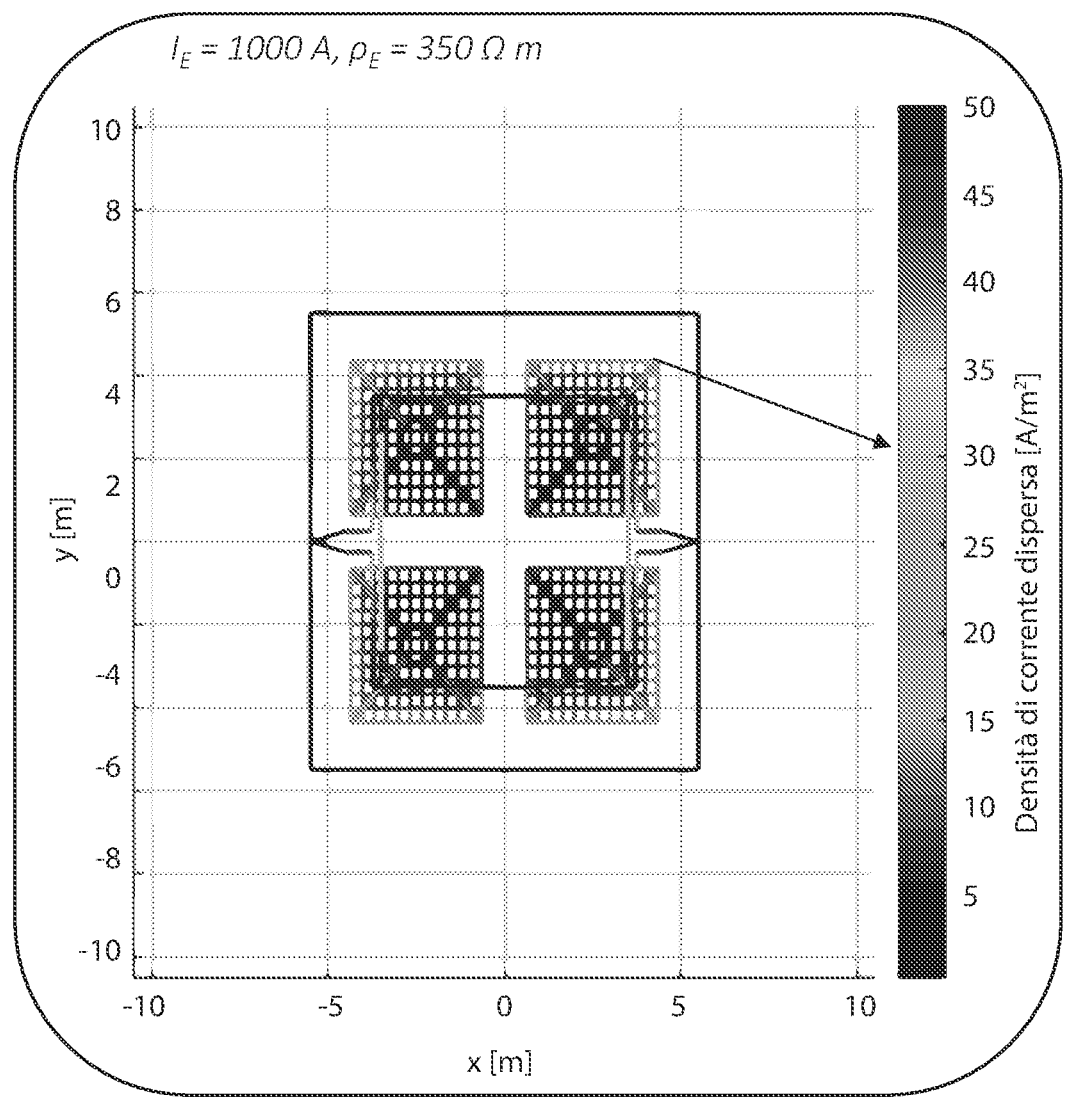

Finally, it is worth noting that the use, according to the present invention, of a buried structure with a double perimeter ring, with the second perimeter ring being larger and placed at a greater depth than the first perimeter ring, makes it possible to reduce the current density dispersed by the foundations of the towers (so-called de facto earthing elements), at the interface with the ground. This reduction mitigates the risk of damaging the concrete cover, ensuring that the integrity of the foundation is preserved over time. In fact, if the concrete is affected by high current fields, it can be damaged by cracking (in particular, due to the heating of the concrete by the Joule effect). The double-perimeter-ring structure according to the present invention allows, by contrast, to reduce by about 40% the current density dispersed by the edges of the foundations compared to the traditional use of a single perimeter ring, as shown in FIGS. 19 and 20 (showing the current density dispersed in case of use, respectively, of a single perimeter ring according to the known art and of two perimeter rings according to the present invention).

Furthermore, as explained above, the mechanical stability of the foundations of the existing towers is related, among other things, to the weight of the ground conoid which weighs down on the foundation feet at an angle of the conoid of between 20° and 30°. The double-perimeter-ring structure according to the present invention (and therefore with the second ring wider and deeper than the first one) also makes it possible to obtain less interference with the foundation conoids (in this respect reference can be made again to FIGS. 16-18).

From the foregoing disclosure, the many innovative characteristics and the innumerable technical advantages of the present invention are immediately evident for a person skilled in the art.

In conclusion, it is important to note that, while the above described invention refers in particular to very specific embodiments, it must not be intended as limited to such embodiments, including within its scope all the variants, modifications, simplifications or generalizations covered by the enclosed claims.

The invention claimed is:

1. A grounding system for a tower of an overhead power line, wherein said tower is anchored to the ground by means of one or more anchorage structures at least partially buried; the grounding system being buried and comprising:
   a first ring-type grounding element that is electrically conductive and that
     is buried at a first predefined depth,
     extends horizontally around the anchorage structure(s) of the tower and
     is electrically connected to the tower;
   a second ring-type grounding element that is electrically conductive and that
     is buried at a second predefined depth deeper than the first predefined depth,
     extends horizontally around the anchorage structure(s) of the tower,
     is larger than the first ring-type grounding element and
     is electrically connected to the first ring-type grounding element via one or more grounding conductors; and
   one or more micropiles which
     are electrically connected to the second ring-type grounding element,
     extend vertically or obliquely downwards from said second ring-type grounding element and
     are configured to act as deep earthing elements;
   wherein the anchorage structure(s) of the tower is/are horizontally symmetrical with respect to two axes of symmetry which include:
     a line axis which corresponds to a direction of longitudinal extension of the power line; and
     a transversal axis which is orthogonal to the line axis;
   wherein also the first ring-type grounding element and the second ring-type grounding element are symmetrical with respect to the line axis and to the transversal axis;
   and wherein the grounding system comprises two first micropiles which:
     are arranged symmetrically and on sides opposite to the transversal axis at two first opposite points of the second ring-type grounding element arranged along the line axis; and
     extend vertically or obliquely downwards from the second ring-type grounding element along the line axis, externally with respect to said second ring-type grounding element.

2. The grounding system of claim 1, wherein the tower is anchored to the ground by means of a plurality of anchorage structures and wherein the grounding system comprises two pairs of first grounding conductors which are arranged symmetrically and on sides opposite to the transversal axis, wherein:
   said first grounding conductors electrically connect the first ring-type grounding element and the second ring-type grounding element together;
   each first grounding conductor is connected to the first ring-type grounding element at a respective anchorage structure of the tower;
   the first grounding conductors of each pair are connected to the second ring-type grounding element at a respective one of the two first opposite points of said second ring-type grounding element.

3. The grounding system of claim 1, wherein the anchorage structure(s) of the tower is/are horizontally symmetrical with respect to two axes of symmetry which include:
   a line axis which corresponds to a direction of longitudinal extension of the power line; and
   a transversal axis which is orthogonal to the line axis;
   wherein also the first ring-type grounding element and the second ring-type grounding element are symmetrical with respect to the line axis and to the transversal axis;
   and wherein the grounding system comprises two pairs of first micropiles which are arranged symmetrically and on sides opposite to the transversal axis, wherein the first micropiles of each pair:
   are arranged symmetrically and on sides opposite to the line axis, each at a respective predefined point of the second ring-type grounding element; and
   extend vertically or obliquely downwards from the second ring-type grounding element externally with respect to the latter and parallelly to a vertical plane passing through the line axis.

4. The grounding system of claim 3, wherein the tower is anchored to the ground by means of a plurality of anchorage structures and wherein the grounding system comprises two pairs of first grounding conductors which are arranged symmetrically and on sides opposite to the transversal axis, wherein:
   said first grounding conductors electrically connect the first ring-type grounding element and the second ring-type grounding element together;
   each first grounding conductor is connected to the first ring-type grounding element at a respective anchorage structure of the tower;
   the first grounding conductors of each pair are arranged symmetrically and on sides opposite to the line axis and are connected to the second ring-type grounding element at a respective one of the predefined points of said second ring-type grounding element.

5. The grounding system according to claim 1, wherein the first micropiles extend obliquely downwards from the second ring-type grounding element (22) with an inclination angle lower than, or equal to, 45°.

6. The grounding system according to claim 1, wherein the first micropiles have one and the same predefined length.

7. The grounding system according to claim 1, also comprising two second micropiles which:
- are arranged symmetrically and on sides opposite to the line axis, at two second opposite points of the second ring-type grounding element arranged along the transversal axis; and
- extend vertically downwards from the second ring-type grounding element.

8. The grounding system of claim 7, wherein the tower is anchored to the ground by means of a plurality of anchorage structures and wherein the grounding system comprises two pairs of second grounding conductors which are arranged symmetrically and on sides opposite to the line axis, wherein:
- said second grounding conductors electrically connect the first ring-type grounding element and the second ring-type grounding element together;
- each second grounding conductor is connected to the first ring-type grounding element at a respective anchorage structure of the tower; and
- the second grounding conductors of each pair are connected to the second ring-type grounding element at a respective one of the two second opposite points of said second ring-type grounding element.

9. The grounding system according to claim 7, wherein the first micropiles and the second micropiles have one and the same predefined length.

10. The grounding system according to claim 1, wherein each micropile includes a respective metal tubular structure internally filled and externally covered with a pressure-injected cement mixture added with one or more conductive inerts having a predefined electric conductivity.

11. The grounding system of claim 10, wherein the cement mixture has a resistivity value lower than 50 $\Omega$m, preferably lower than 20 $\Omega$m.

12. The grounding system according to claim 10, wherein each micropile includes a respective bulb portion formed externally at a respective lower end of the respective metal tubular structure, wherein said respective bulb portion is formed by pressure injecting the cement mixture and is such that to increase electrical earthing capacity of said micropile.

* * * * *